US012640519B2

(12) United States Patent
Zhao et al.

(10) Patent No.: US 12,640,519 B2
(45) Date of Patent: May 26, 2026

(54) RETAINER, TEMPERATURE DETECTION ASSEMBLY, CONNECTOR HOUSING AND CONNECTOR

(71) Applicants: Tyco Electronics (Suzhou) Ltd., Suzhou (CN); Tyco Electronics (Shanghai) Co., Ltd., Shanghai (CN)

(72) Inventors: Wei (Weiser) Zhao, Suzhou (CN); Kaixuan (Evan) Jiang, Shanghai (CN); Feisong Ma, Shanghai (CN); Dongdong Li, Suzhou (CN); Rancher Chen, Shanghai (CN)

(73) Assignees: Tyco Electronics (Suzhou) Ltd., Suzhou City (CN); Tyco Electronics (Shanghai) Co., Ltd., Shanghai (CN)

( * ) Notice: Subject to any disclaimer, the term of this patent is extended or adjusted under 35 U.S.C. 154(b) by 471 days.

(21) Appl. No.: 18/191,070

(22) Filed: Mar. 28, 2023

(65) Prior Publication Data

US 2023/0307874 A1 Sep. 28, 2023

(30) Foreign Application Priority Data

Mar. 28, 2022 (CN) ........................ 202220691080.X

(51) Int. Cl.

| | |
|---|---|
| ***H01R 13/639*** | (2006.01) |
| ***G01K 1/14*** | (2021.01) |
| ***H01R 13/66*** | (2006.01) |

(52) U.S. Cl.

CPC ....... *H01R 13/639* (2013.01); *H01R 13/6683* (2013.01)

(58) Field of Classification Search

CPC .............. H01R 13/639; H01R 13/6683; H01R 2201/26; G01K 1/14; G01K 1/16

See application file for complete search history.

(56) References Cited

U.S. PATENT DOCUMENTS

| | | | | |
|---|---|---|---|---|
| 9,570,862 | B2 * | 2/2017 | Kawai | H01R 13/04 |
| 12,424,789 | B2 * | 9/2025 | McKee | H01R 13/635 |
| 2020/0067237 | A1 * | 2/2020 | Sarraf | H01R 13/6683 |
| 2020/0083701 | A1 * | 3/2020 | Myer | G01K 5/52 |
| 2020/0290468 | A1 * | 9/2020 | Moseke | H01R 13/6683 |
| 2023/0096869 | A1 * | 3/2023 | Garcia-Ferre | B60L 53/302 320/109 |

FOREIGN PATENT DOCUMENTS

| | | | | |
|---|---|---|---|---|
| PL | 3846294 | * | 7/2021 | H01R 13/66 |

* cited by examiner

*Primary Examiner* — Abdullah A Riyami
*Assistant Examiner* — Thang H Nguyen
(74) *Attorney, Agent, or Firm* — Barley Snyder

(57) ABSTRACT

A temperature detection assembly includes an elastic thermal conductivity component, a temperature sensor and a retainer. The elastic thermal conductivity component is formed with a mounting hole and is adapted to be inserted into an installation slot formed on a housing of a connector. The temperature sensor is inserted in the mounting hole of the elastic thermal conductivity component and is adapted to detect the temperature of a connection terminal of the connector. The retainer is adapted to be installed on the housing of the connector and to fix the elastic thermal conductivity component in the installation slot.

22 Claims, 16 Drawing Sheets

RETAINER, TEMPERATURE DETECTION ASSEMBLY, CONNECTOR HOUSING AND CONNECTOR

CROSS-REFERENCE TO RELATED APPLICATIONS

This application claims the benefit of Chinese Patent Application No. CN202220691080.X filed on Mar. 28, 2022 in the State Intellectual Property Office of China, the whole disclosure of which is incorporated herein by reference.

FIELD OF THE INVENTION

The present invention relates to a retainer, a temperature detection assembly comprising the retainer, a connector housing and a connector including the temperature detection assembly.

BACKGROUND

A connector according to the prior art generally comprises a housing, a connection terminal and a temperature detection device. The connection terminal is installed in the housing. The temperature detection device usually includes an elastic heat conduction pad and a temperature sensor installed in the elastic heat conduction pad. The elastic heat conduction pad is typically inserted in a slot formed on the housing. The elastic heat conduction pad is in thermal contact with the connection terminal, and the temperature sensor is thermally connected with the connection terminal through the elastic heat conduction pad, so as to detect the temperature of the connection terminal.

However, in the prior art, the elastic thermal conductive pad is usually inserted into the slot of the housing with an interference fit. When subjected to a certain pulling force, for example, when pulling the lead wire of the temperature sensor, the elastic thermal conductive pad is easy to loosen and even be pulled out of the slot of the housing, which will affect the reliability of the thermal contact between the elastic thermal conductive pad and the connection terminal. This can lead to an inability to accurately detect the temperature of the connection terminal.

SUMMARY

According to an embodiment of the present disclosure, a temperature detection assembly includes an elastic thermal conductivity component, a temperature sensor, and a retainer. The elastic thermal conductivity component is formed with a mounting hole and is adapted to be inserted into an installation slot formed on a housing of a connector. The temperature sensor is inserted in the mounting hole of the elastic thermal conductivity component and is adapted to detect the temperature of a connection terminal of the connector. The retainer is adapted to be installed on the housing of the connector and fix the elastic thermal conductivity component in the installation slot.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
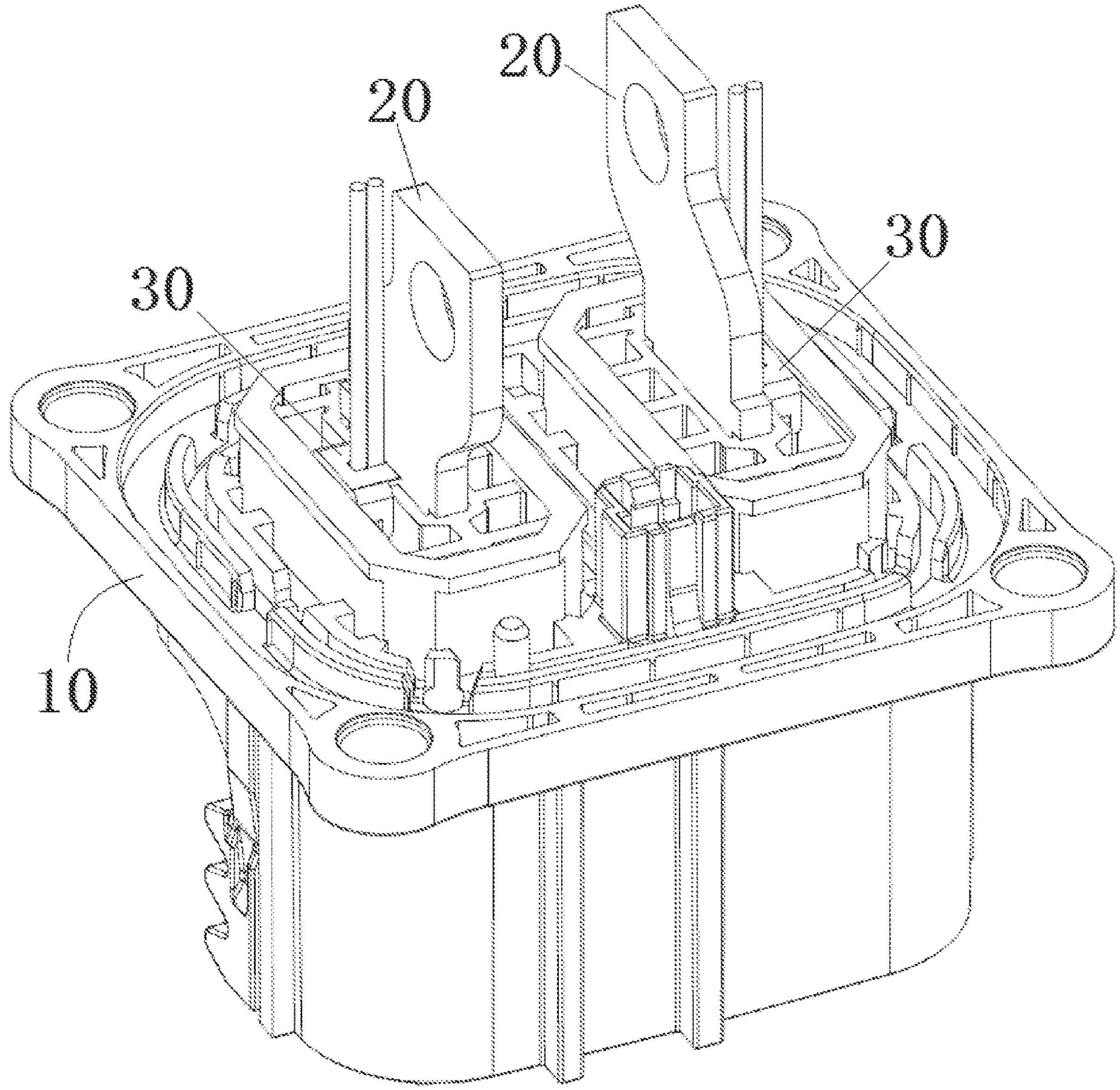
FIG. 1 shows an illustrative perspective view of a connector according to the first embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A retainer for fixing a temperature sensor in a housing of a connector according to an embodiment of the present disclosure includes a main body for resting against an elastic thermal conductivity component, and a fixing part. The fixing part is adapted to be installed on the housing of the connector and has a locking feature adapted to be locked to the housing of the connector. When the retainer is locked to the housing of the connector, the retainer rests against the elastic thermal conductivity component to keep the elastic thermal conductivity component in an installation slot of the housing.

According to another embodiment, a temperature detection assembly is provided. The temperature detection assembly includes an elastic thermal conductivity component which is formed with a mounting hole and is adapted to be inserted into an installation slot formed on a housing of a connector. A temperature sensor which is inserted in the mounting hole of the elastic thermal conductivity component to detect the temperature of a connection terminal of the connector. The retainer according to the above-described embodiment is installed on the housing of the connector and is configured to fix the elastic thermal conductivity component in the installation slot.

A connector housing according to another embodiment of the present disclosure is formed with a terminal slot and an installation slot communicated with the terminal slot. The terminal slot is used to accommodate a connection terminal, and the installation slot is used to accommodate a part of the above temperature detection assembly.

A connector according to another embodiment of the present disclosure includes the above housing and the above temperature detection assembly which is installed on the housing. The elastic thermal conductivity component is inserted into the installation slot, and the elastic thermal conductivity component is fixed in the installation slot by the retainer. The temperature sensor is thermally connected with the connection terminal via the elastic thermal conductivity component for detecting the temperature of a connection terminal.

Figure 2:
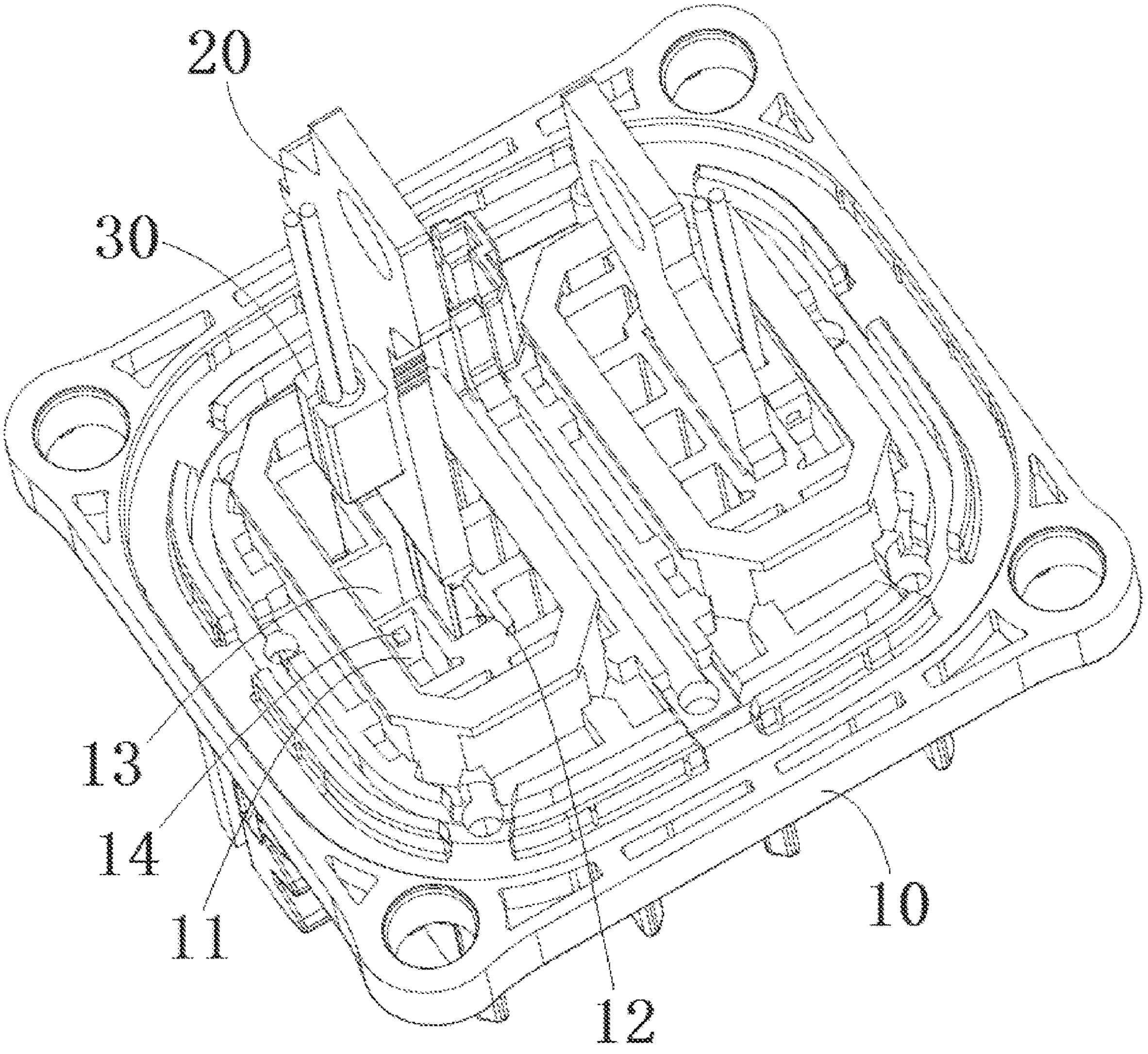
FIG. 2 shows the illustrative perspective view of the connector shown in FIG. 1, wherein the connection terminal and temperature detection assembly are not installed on the housing.

FIGS. 1-8 show a connector according to an embodiment of the present invention. FIG. 1 shows an illustrative perspective view of the connector according to the first embodiment of the present invention. FIG. 2 shows an illustrative perspective view of the connector shown in FIG. 1, wherein a connection terminal and a temperature detection assembly are not installed on a housing.

As shown in FIGS. 1 and 2, a connector according to embodiments of the present disclosure includes a housing 10, a connection terminal 20 and a temperature detection assembly 30. The housing 10 is formed with a terminal slot 12 and an installation slot 13 in communication with the terminal slot. The connection terminal 20 is inserted into the terminal slot 12. The temperature detection assembly 30 is installed on housing 10.

Figure 3:
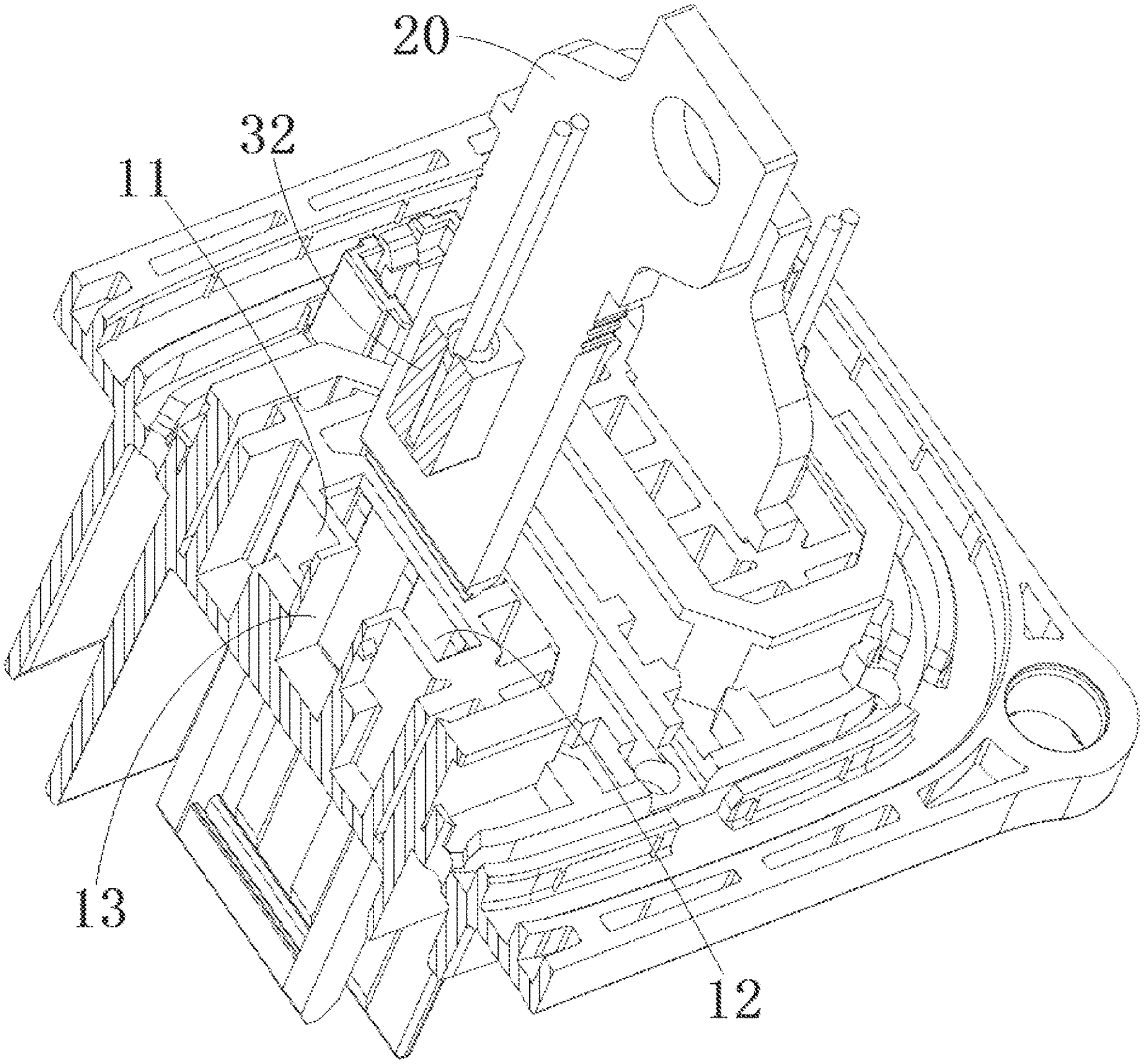
FIG. 3 shows the sectional view of the connector shown in FIG. 1, wherein the connection terminal and temperature detection assembly are not installed on the housing.
Figure 4:
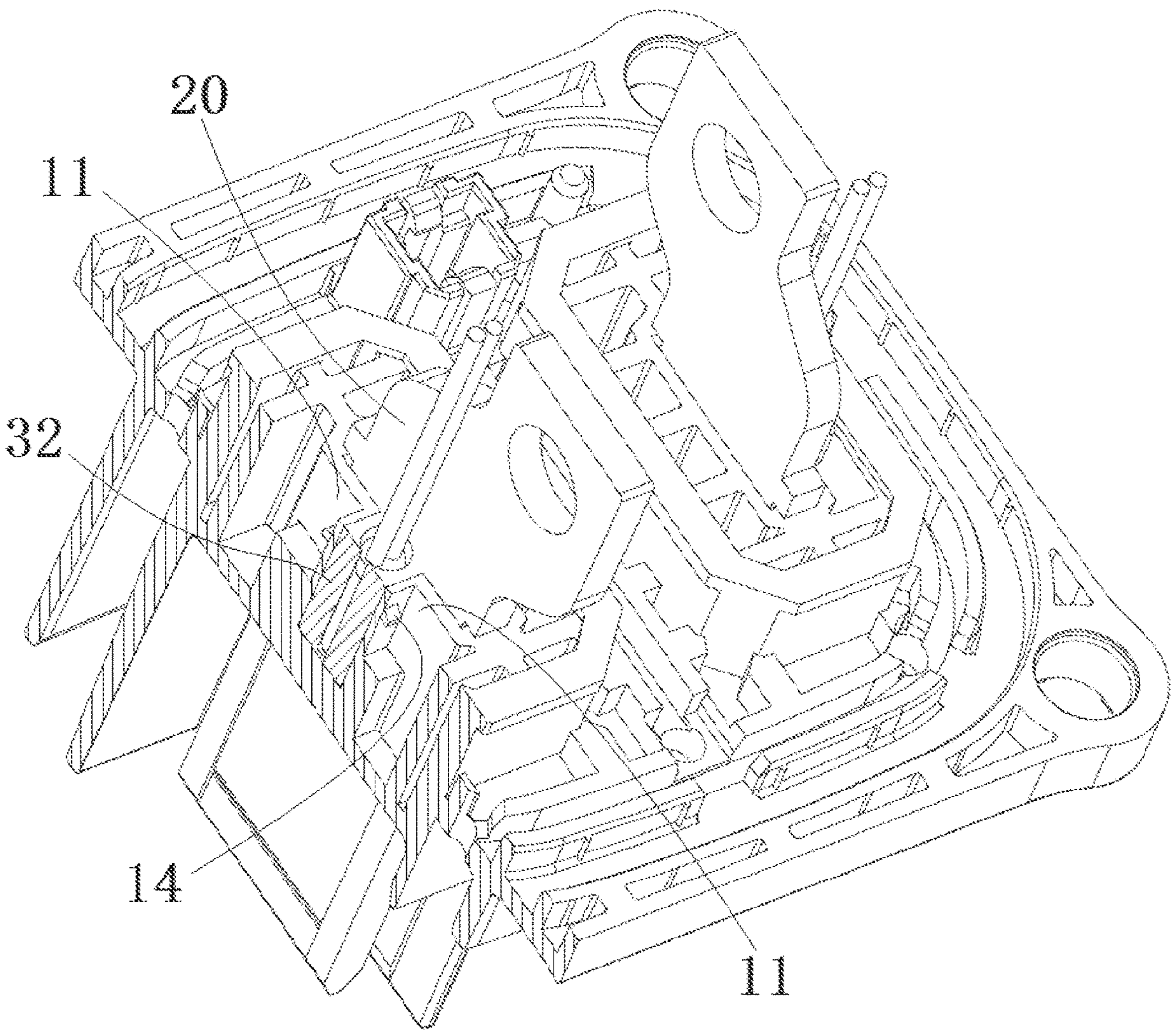
FIG. 4 shows the sectional view of the connector shown in FIG. 1, in which the connection terminal and the elastic thermal conductivity have been installed on the housing.
Figure 5:
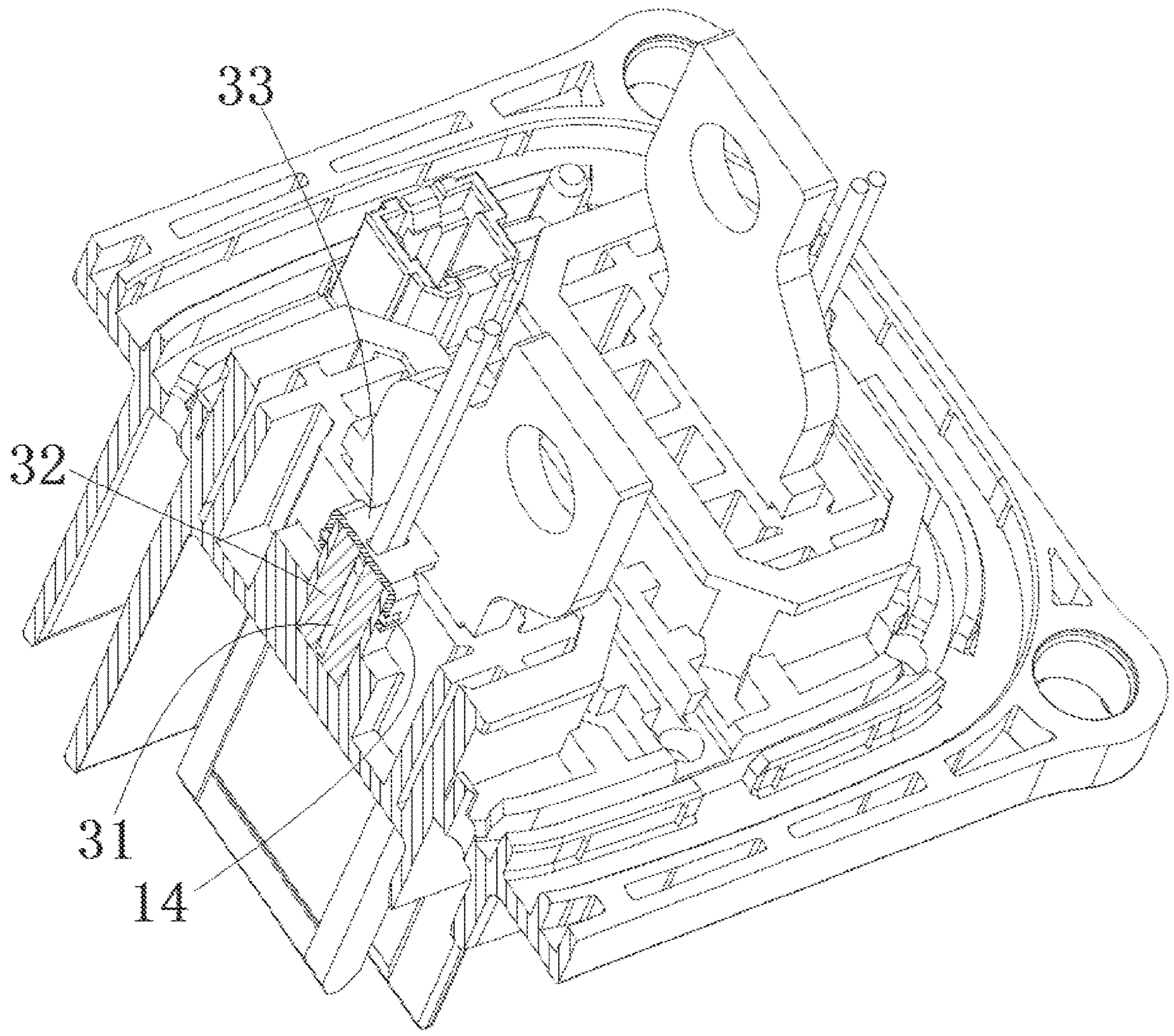
FIG. 5 shows the sectional view of the connector shown in FIG. 1, where the connection terminal and temperature detection assembly have been installed on the housing.
Figure 6:
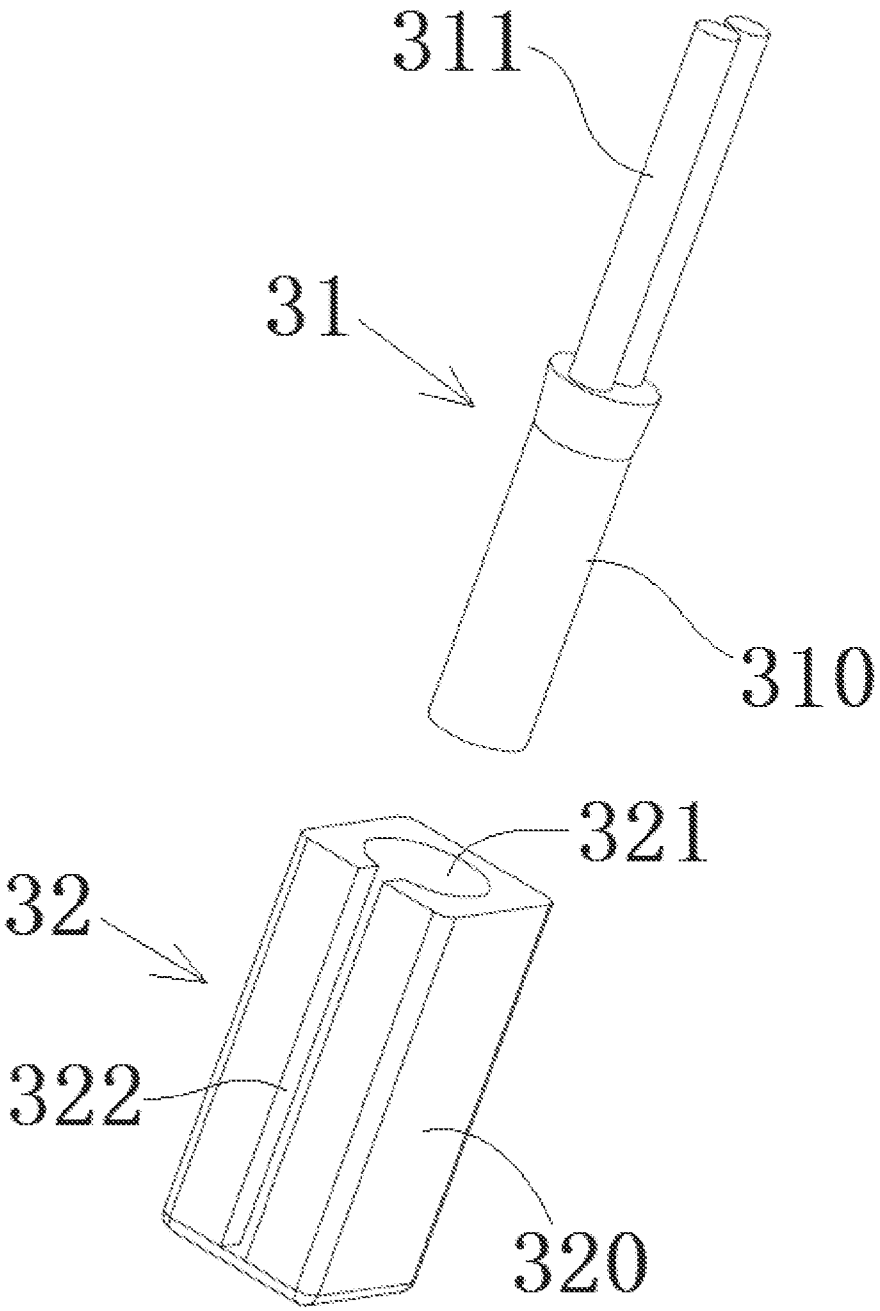
FIG. 6 shows an illustrative exploded view of the elastic thermal conductivity component and temperature sensor of the temperature detection assembly shown in FIG. 1.
Figure 7:
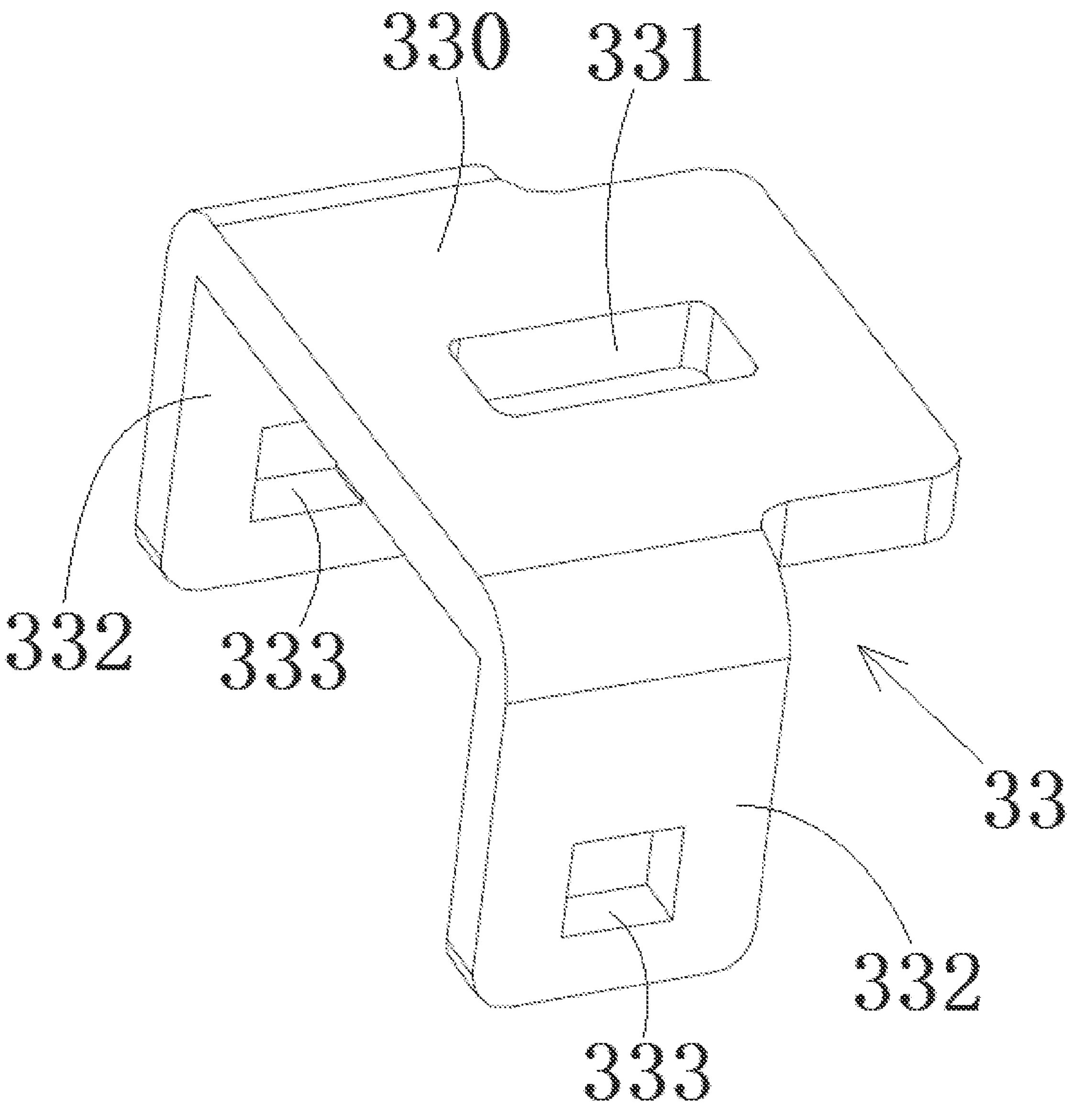
FIG. 7 shows an illustrative perspective view of the retainer of the temperature detection assembly shown in FIG. 1.
Figure 8:
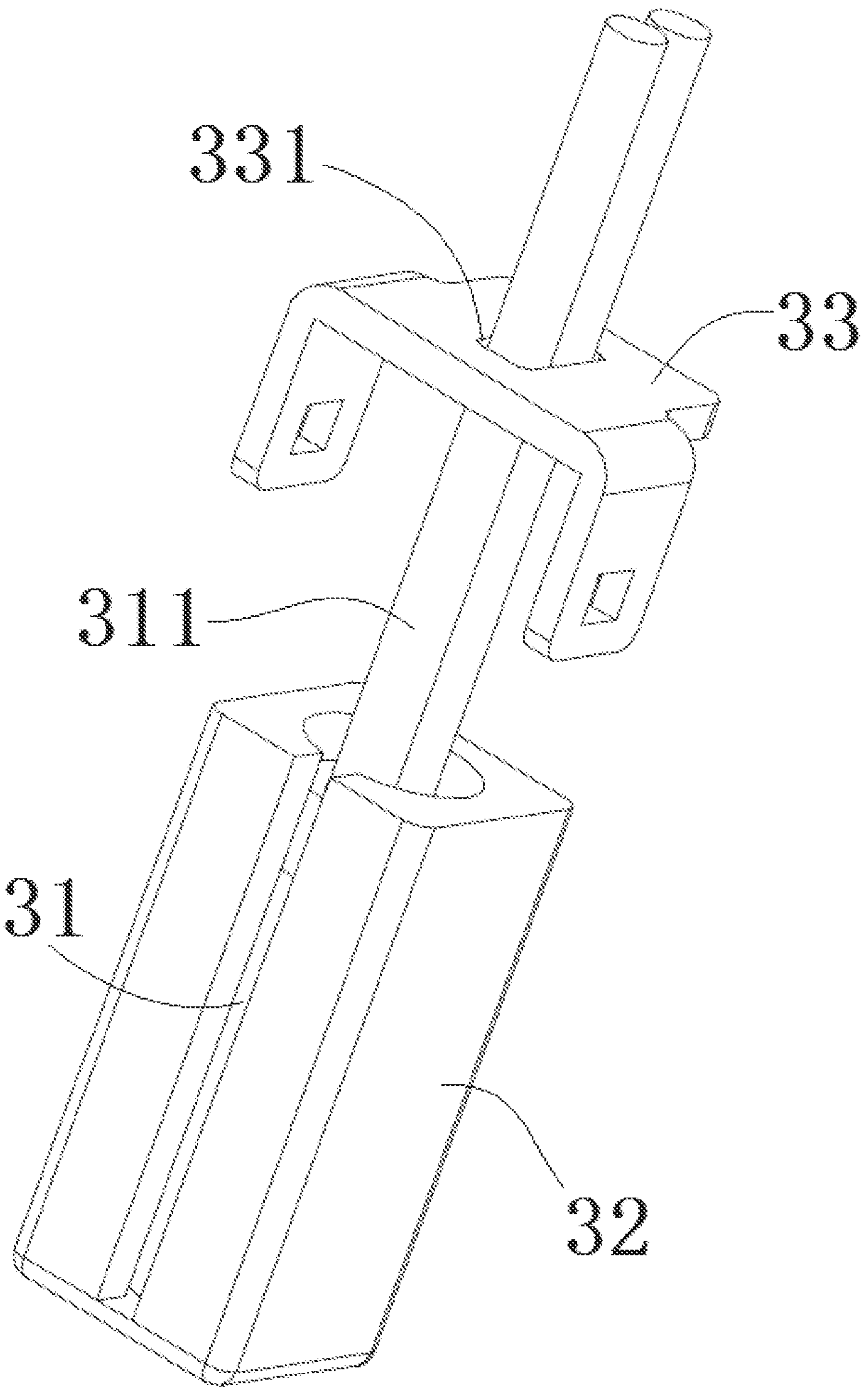
FIG. 8 shows an illustrative perspective view of the temperature detection assembly shown in FIG. 1.

FIG. 3 is a sectional view of the connector shown in FIG. 1, wherein the connection terminal 20 and the temperature detection assembly 30 are not installed on or in the housing 10. FIG. 4 is a sectional view of the connector shown in FIG. 1, wherein the connection terminal 20 and an elastic thermal conductivity component 32 have been installed on the housing 10. FIG. 5 is a sectional view of the connector shown in FIG. 1, wherein the connection terminal 20 and the temperature detection assembly 30 have been installed on the housing 10. FIG. 6 is an illustrative exploded view of the elastic thermal conductivity component 32 and a temperature sensor 31 of the temperature detection assembly 30 shown in FIG. 1. FIG. 7 is an illustrative perspective view of a latching cap or retainer 33 of the temperature detection assembly 30 shown in FIG. 1. FIG. 8 is an illustrative perspective view of the temperature detection assembly 30 shown in FIG. 1.

As shown in FIGS. 1-8, the temperature detection assembly 30 includes the temperature sensor 31, the elastic thermal conductivity component 32 and the retainer 33. The elastic thermal conductivity component 32 has a mounting hole 321 and is inserted into the installation slot 13 on the housing 10. The temperature sensor 31 is inserted in the mounting hole 321 of the elastic thermal conductivity component 32 to detect the temperature of the connection terminal 20 of the connector. The retainer 33 is installed on the housing 10 of the connector and is used to fix the elastic thermal conductivity component 32 in the installation slot 13 of the housing 10. The retainer 33 is adapted to be mounted on the housing 10 of the connector and has a locking feature 333 adapted to be locked to the housing. When the retainer 33 is locked to the housing 10 of the connector, it rests against a top surface of the elastic thermal conductivity component 32 to fix the elastic thermal conductivity component in the installation slot 13 of the housing.

The retainer 33 may be referred to as a latching cap and comprises a main body 330 and a pair of side plates or walls 332. A lead through-hole 331 is formed through the main body 330 to allow a pair of lead wires 311 of the temperature sensor 31 to pass therethrough. The pair of side plates 332 are respectively connected to both lateral sides of the main body 330 and are adapted to be inserted into two fixing slots 11 formed on the housing 10 of the connector respectively.

The locking feature 333 is formed on the side plate 332 and is suitable for engagement with a mating locking feature or latch 14 formed on the inner wall of the fixing slot 11. The bottom surface of the main body 330 is adapted to rest against the top surface of the elastic thermal conductivity component 32 to fix the elastic thermal conductivity component in the installation slot 13.

The locking feature 333 may be a locking slot 333 formed on the side plate 332, and the aforementioned mating locking feature 14 may be a protrusion 14 formed on the inner wall of the fixing slot 11 and suitable for engagement with the locking slot. However, the present invention is not limited to the illustrated embodiments. For example, the aforementioned locking feature 333 may be a protrusion formed on the side plate 332, and the aforementioned mating locking feature 14 may be a concave feature or depression formed on the inner wall of the fixing slot 11 and suitable for engagement with the protrusion.

In the exemplary embodiment, the temperature sensor 31 includes a detection component 310 and the pair of lead wires 311. The detection component 310 is inserted into the mounting hole 321 and is in thermal contact with the inner surface of the mounting hole 321. The pair of lead wires 311 is electrically connected with the detection component 310 and extends to the outside of the mounting hole 321.

The detection component 310 is inserted in the mounting hole 321 of the elastic thermal conductivity component 32 with an interference fit to create and ensure reliable thermal contact with the inner surface of the mounting hole 321. The elastic thermal conductivity component 32 includes a thermal conductivity body 320. The mounting hole 321 is formed in the thermal conductivity body 320 and extends along the longitudinal direction thereof.

A slit 322 communicating with the mounting hole 321 is formed on one side of the thermal conductivity body 320 of the elastic thermal conductivity component 32. The slit 322 extends continuously from one end of the mounting hole 321 to the other end of the mounting hole. In this way, the insertion force of the temperature sensor 31 into the mounting hole 321 is reduced, and the installation of the temperature sensor 31 is made easier. The mounting hole 321 is a blind hole with a bottom, and the temperature sensor 31 is inserted into the mounting hole through the top opening thereof.

The thermal conductivity body 320 has a thermal contact surface suitable for physical contact with the connection terminal 20. The slit 322 is formed on the side of the thermal conductivity body 320 opposite to the thermal contact surface. In this way, the thermal contact area between the thermal conductivity body 320 and the connection terminal 20 is not reduced.

The connector may include a plurality of connection terminals 10 and a plurality of temperature detection assemblies 30. The plurality of temperature detection assemblies 30 are used to detect the temperature of the plurality of connection terminals 10 respectively. For example, in the illustrated embodiment, the connector is a DC connector with two connection terminals 20 and two temperature detection assemblies 30. However, the present invention is not limited to the illustrated embodiment. The connector can also be an AC connector including four connection terminals 20 and four temperature detection assemblies 30. In an exemplary embodiment, the number of temperature detection assemblies 30 can also be less than the number of connection terminals 20, that is, the temperature of a part or portion of the connection terminals 20 can be detected.

Figure 9:
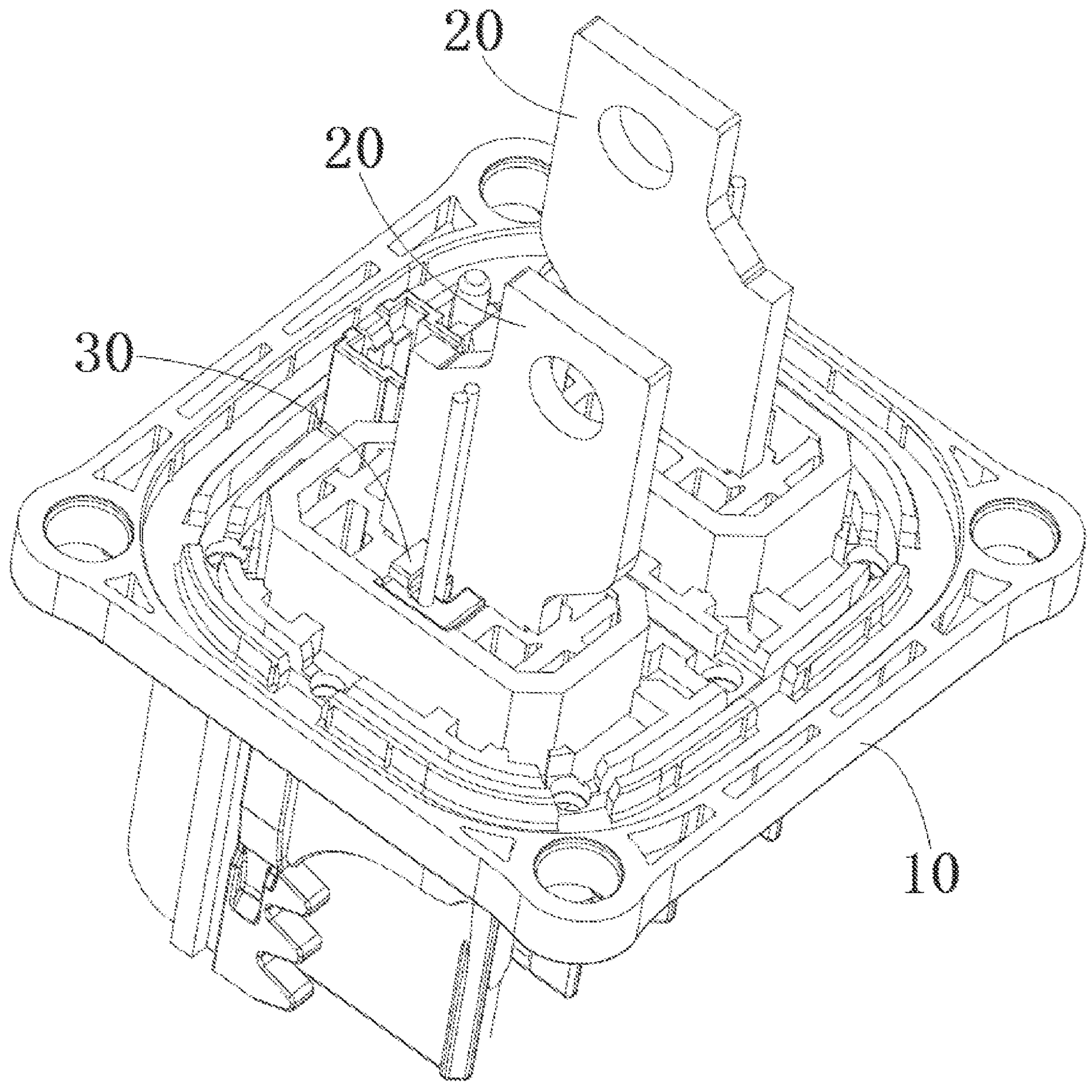
FIG. 9 shows an illustrative perspective view of the connector according to a second embodiment of the present invention.
Figure 10:
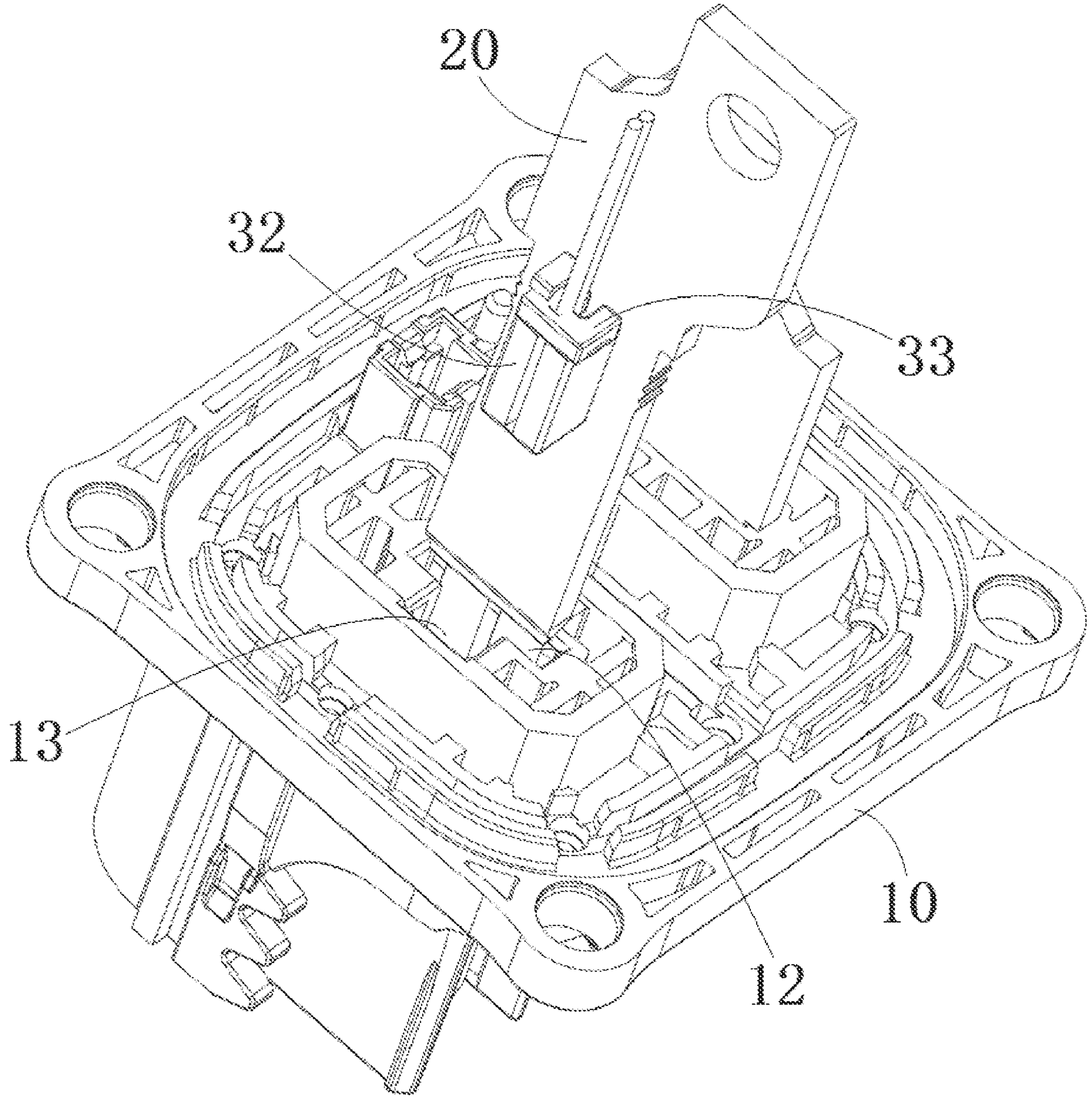
FIG. 10 shows the illustrative perspective view of the connector shown in FIG. 9, wherein the connection terminal and temperature detection assembly are not installed on the housing.

FIGS. 9-16 illustrate a connector according to a second embodiment of the present disclosure. FIG. 9 is an illustrative perspective view of a connector according to the second embodiment of the present invention. FIG. 10 is an illustrative perspective view of the connector shown in FIG. 9, wherein a connection terminal 20 and a temperature detection assembly 30 are not installed on a housing 10.

As shown in FIGS. 9 and 10, like the embodiment of FIGS. 1-8, the connector according to the second embodiment includes the housing 10, the connection terminal 20 and the temperature detection assembly 30. The housing 10 is formed with a terminal slot 12 and an installation slot 13 in communication with the terminal slot 12. The connection terminal 20 is inserted in the terminal slot 12. The temperature detection assembly 30 is installed on housing 10.

Figure 11:
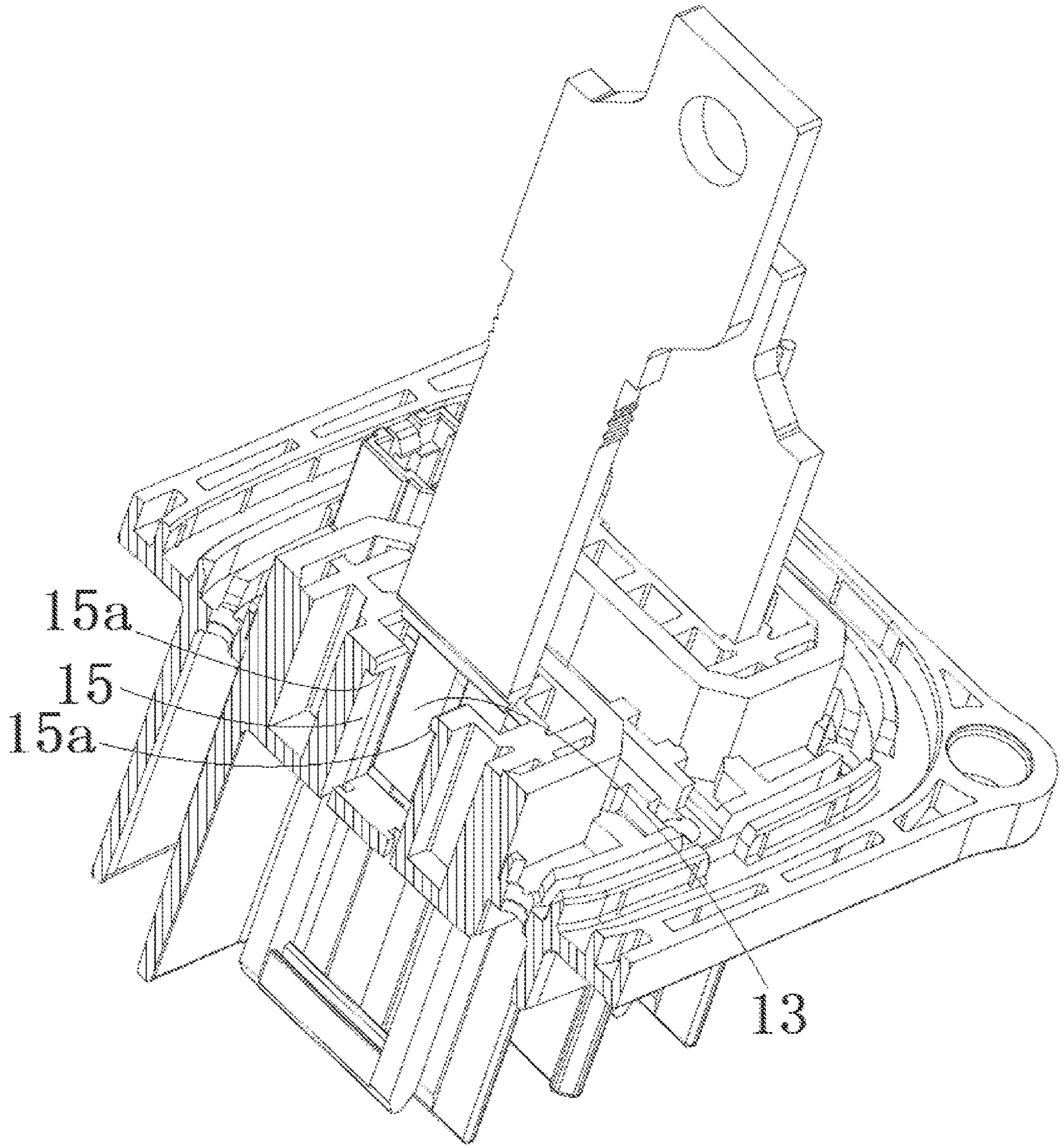
FIG. 11 shows the sectional view of the connector shown in FIG. 9, wherein the connection terminal and temperature detection assembly are not installed on the housing.
Figure 12:
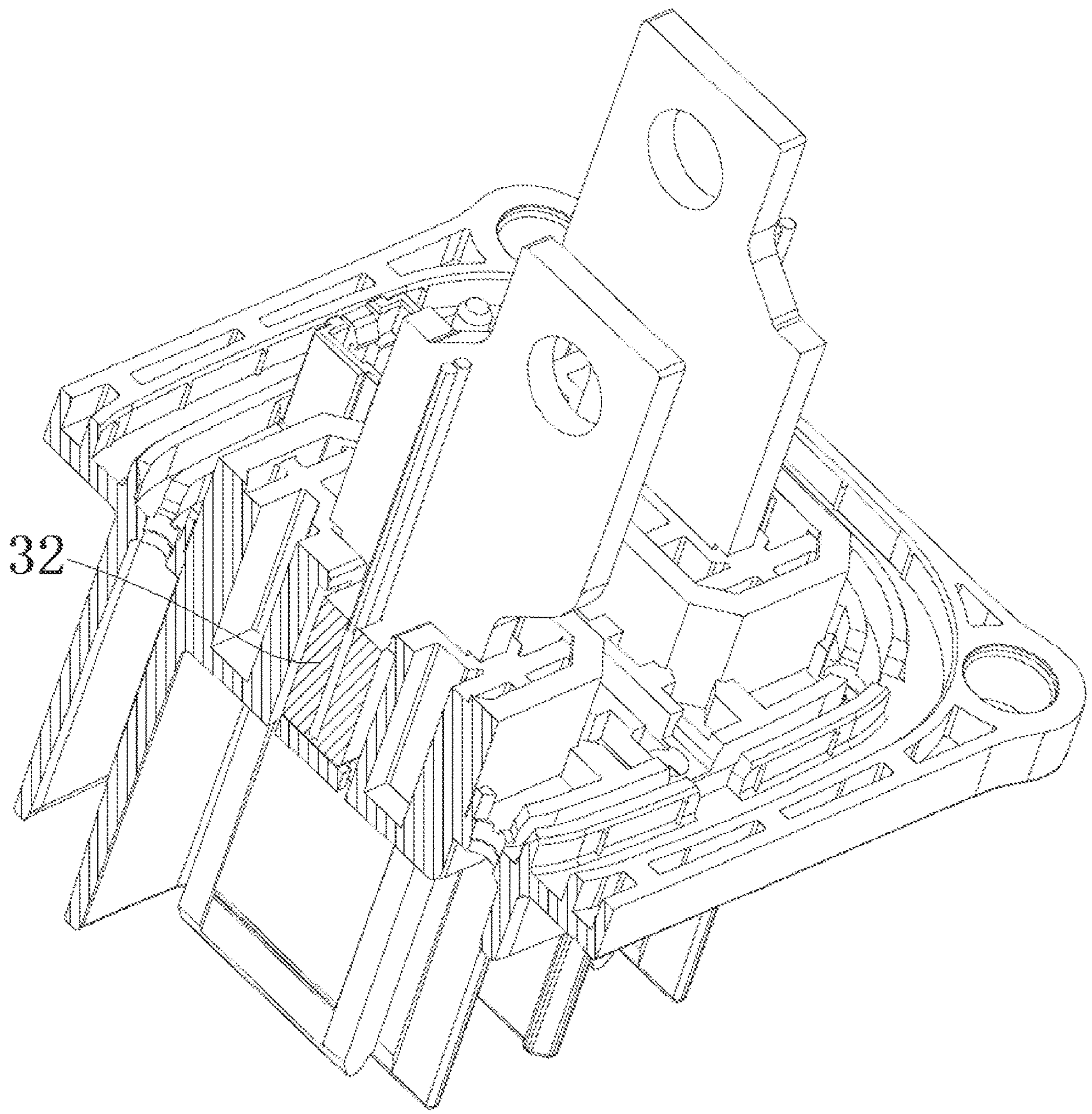
FIG. 12 shows the sectional view of the connector shown in FIG. 9, in which the connection terminal and the elastic thermal conductivity have been installed on the housing.
Figure 13:
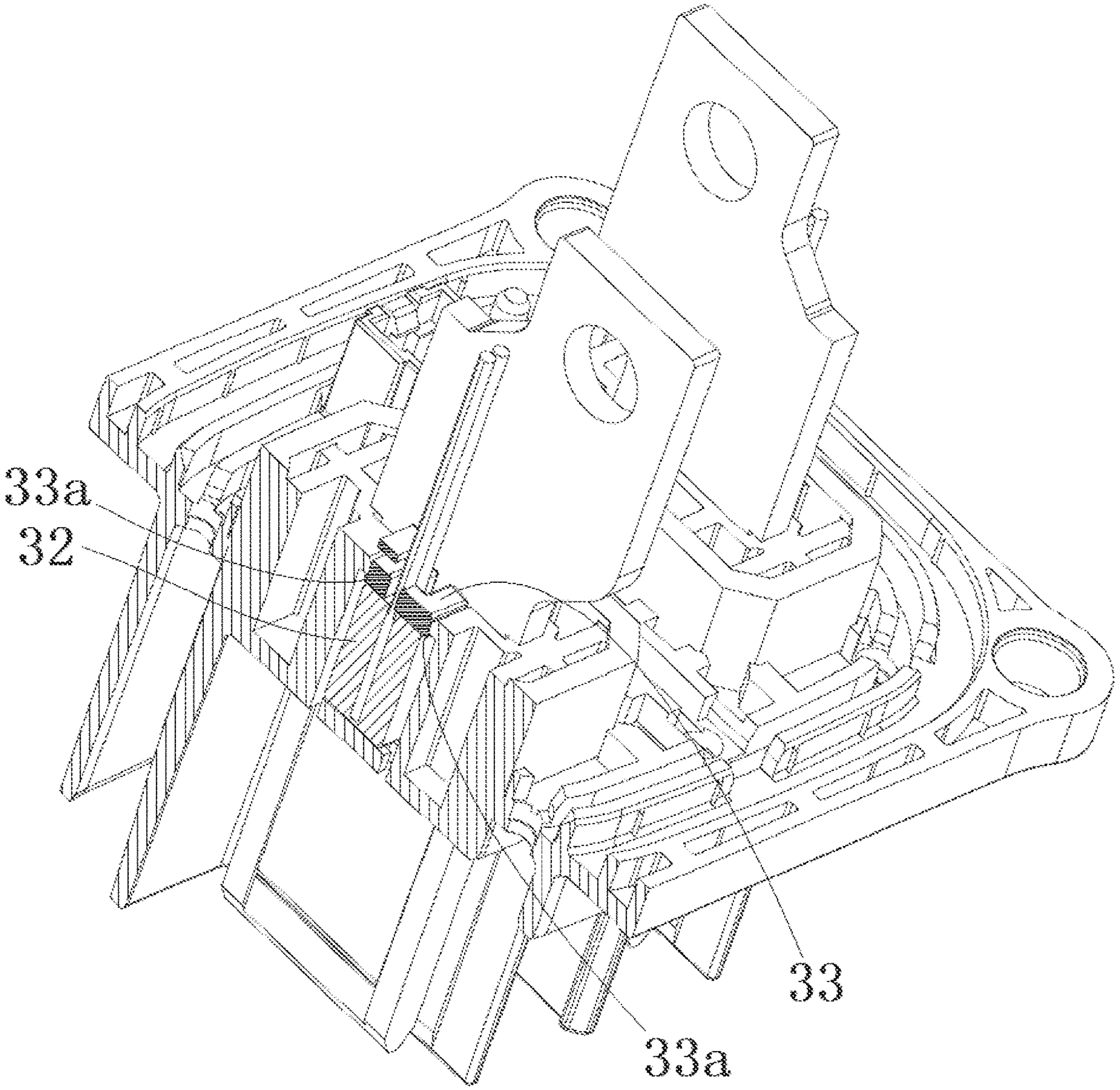
FIG. 13 shows the sectional view of the connector shown in FIG. 9, where the connection terminal and temperature detection assembly have been installed on the housing.
Figure 14:
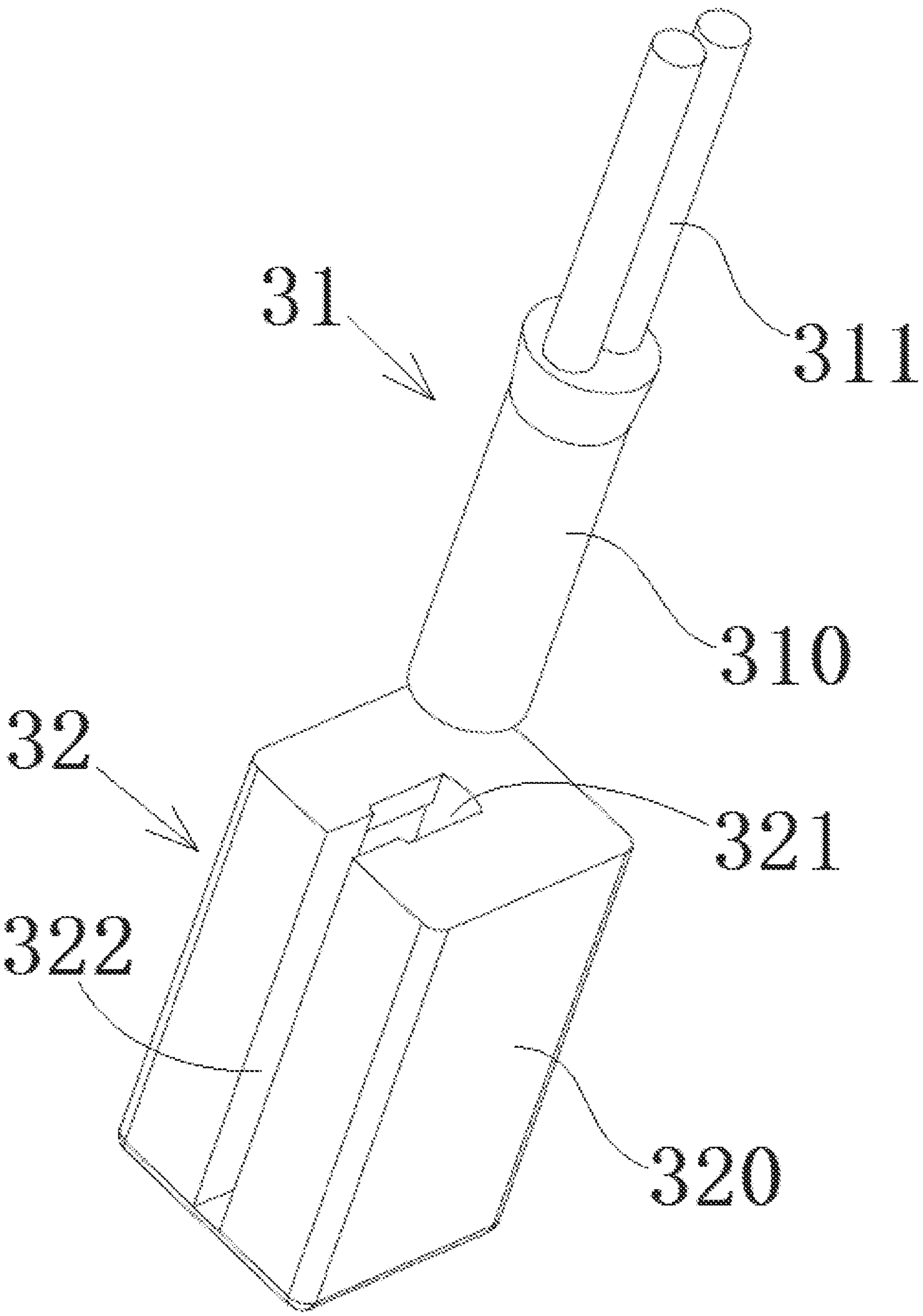
FIG. 14 shows an illustrative exploded view of the elastic thermal conductivity component and temperature sensor of the temperature detection assembly shown in FIG. 9.
Figure 15:
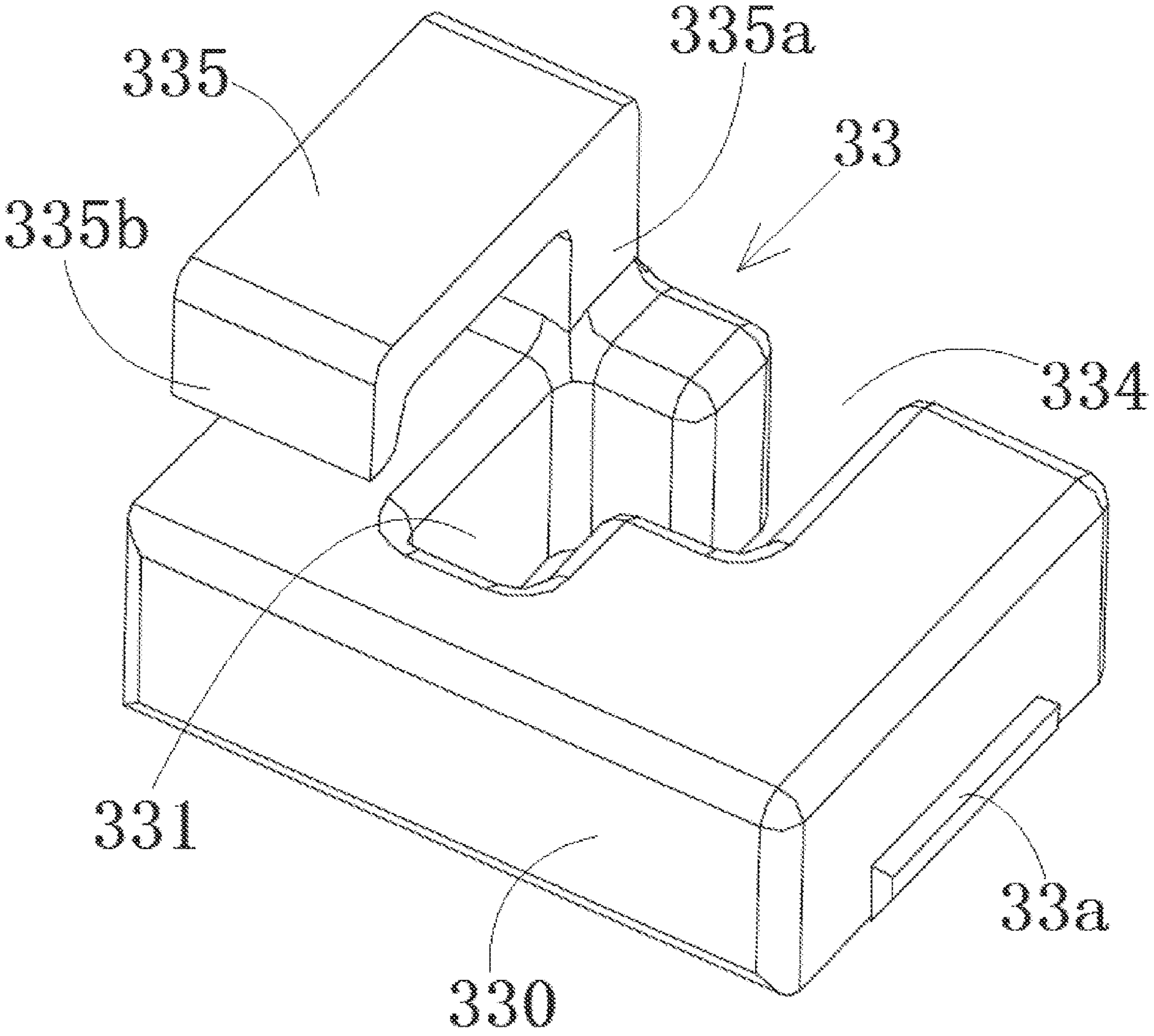
FIG. 15 shows an illustrative perspective view of the retainer of the temperature detection assembly shown in FIG. 9.
Figure 16:
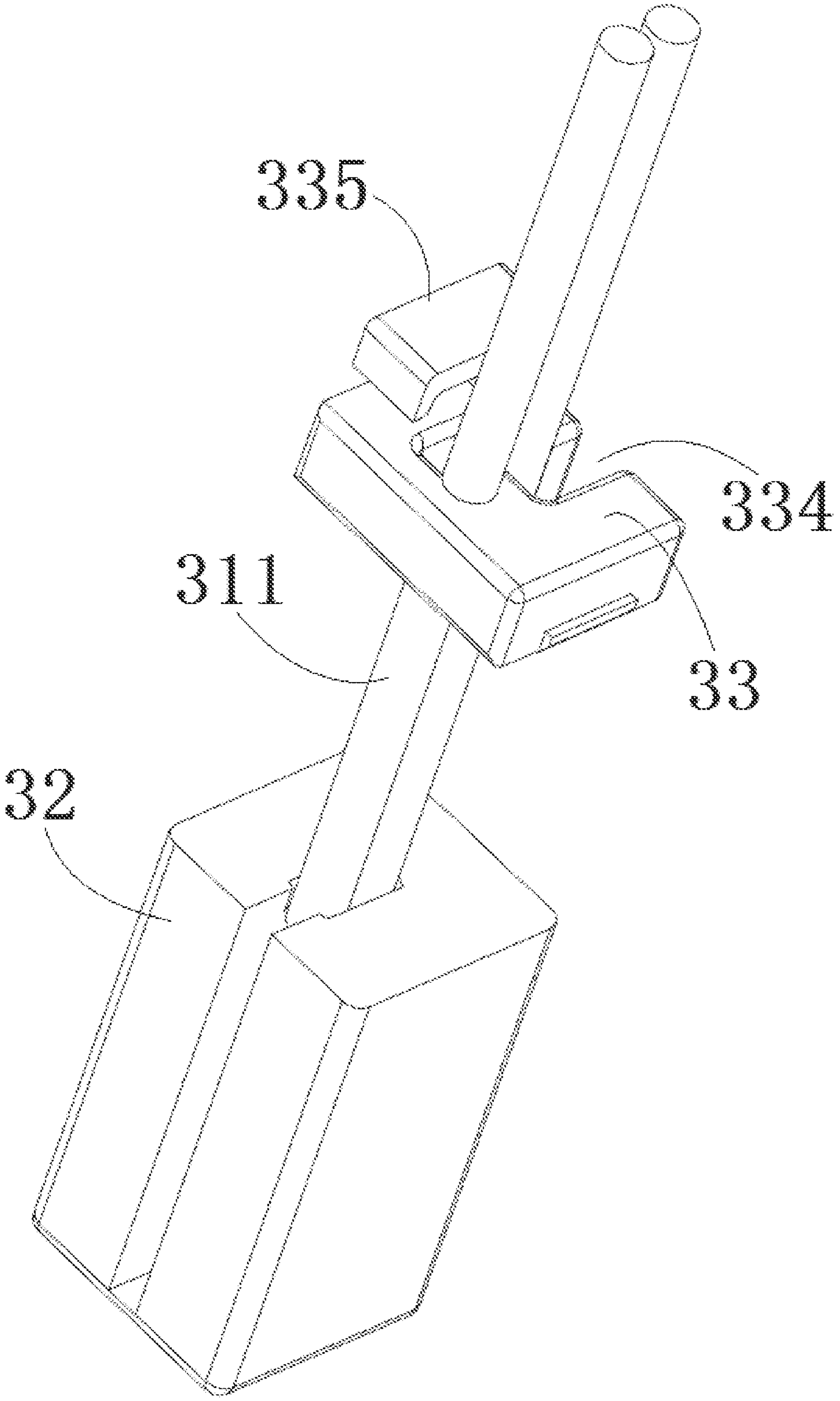
FIG. 16 shows an illustrative perspective view of the temperature detection assembly shown in FIG. 9.

FIG. 11 is a sectional view of the connector shown in FIG. 9, wherein the connection terminal 20 and the temperature detection assembly 30 are not installed on the housing 10. FIG. 12 is a sectional view of the connector shown in FIG. 9, wherein the connection terminal 20 and an elastic thermal conductivity component 32 have been installed on the housing 10. FIG. 13 is a sectional view of the connector shown in FIG. 9, wherein the connection terminal 20 and the temperature detection assembly 30 have been installed on the housing 10. FIG. 14 is an illustrative exploded view of the elastic thermal conductivity component 32 and a temperature sensor 31 of the temperature detection assembly 30 shown in FIG. 9. FIG. 15 is an illustrative perspective view of a latching cap or retainer 33 of the temperature detection assembly 30 shown in FIG. 9. FIG. 16 is an illustrative perspective view of the temperature detection assembly 30 shown in FIG. 9.

As shown in FIGS. 9-16, in the illustrated embodiment, the temperature detection assembly 30 includes the temperature sensor 31, the elastic thermal conductivity component 32 and the retainer 33. The elastic thermal conductivity component 32 has a mounting hole 321 and is inserted into the installation slot 13 of the housing 10. The temperature sensor 31 is inserted in the mounting hole 321 of the elastic thermal conductivity component 32 to detect the temperature of the connection terminal 20 of the connector. The retainer 33 is installed on the housing 10 of the connector and is used to fix the elastic thermal conductivity component 32 in the installation slot 13.

The retainer 33 is used to fix the elastic thermal conductivity component 32 on the housing 10 of the connector. The retainer 33 is adapted to be mounted on the housing 10 of the connector and has a locking feature 33*a* adapted to be locked to the housing of the connector. When the retainer 33 is locked to the housing 10 of the connector, the retainer rests against a top surface of the elastic thermal conductivity component 32 to fix the elastic thermal conductivity component in the installation slot 13 of the housing.

The retainer 33 includes a main body 330. A lead through-hole 331 is formed on the main body 330 to allow a pair of lead wires 311 of the temperature sensor 31 to pass therethrough. The main body 330 is adapted to be inserted into the installation slot 13, and the locking feature 33*a* is formed on both sides of the main body and is adapted to engage with a mating locking feature 15*a* formed on the inner wall of the installation slot.

The aforementioned locking feature 33*a* is a strip-shaped protrusion part formed on the main body 330. The mating lock feature 15*a* is a step part formed on the inner wall of the installation slot 13 and is adapted to engage with the protrusion part 33*a*. As shown in FIG. 11, a fixing slot 15 is formed on the inner wall of the installation slot 13. The inner wall of the top of the fixing slot 15 forms a step part 15*a* which is connected with the protrusion part 33*a*.

In the illustrated embodiment, the retainer 33 also includes a binding part 335. The binding part 335 is connected to the main body 330, and is adapted to bind the pair of lead wires 311 of the temperature sensor 31 to the main body 330. When the pair of lead wires 311 of the temperature sensor 31 is not bound by the binding part 335, the pair of lead wires of the temperature sensor 31 is led out from the retainer 33 in a first direction. For example, in the illustrated embodiment, the pair of lead wires 311 of the temperature sensor 31 can be led out from the retainer 33 along the axial direction of the housing 10 of the connector.

When the pair of lead wires 311 of the temperature sensor 31 is bound by the binding part 335, the pair of lead wires is led out from the retainer 33 in a second direction at a predetermined angle with the first direction. For example, in the illustrated embodiment, the pair of lead wires 311 of the temperature sensor 31 can be led out from the retainer 33 along the radial direction of the housing 10 of the connector.

The wire binding part 335 is formed into a curved hook elastic cantilever suitable for binding the pair of lead wires 311 to the main body 330. The fixed end 335*a* of the binding part 335 is connected to the top of the main body 330. The pair of lead wires 311 can enter the binding part 335 through the gap between the free end 335*b* of the binding part and the top of the main body 330.

A side opening 334 communicated with the lead through-hole 331 is formed on the side of the main body 330, so that the pair of lead wires 311 can enter the lead through-hole therethrough. In this way, the pair of lead wires 311 can be inserted into the lead through-hole 331 of the retainer 33 after being electrically connected with an electronic component (not shown). If there is no such side opening 334, the pair of lead wires 311 must be pre-inserted into the lead through-hole 331 of the retainer 33 before being electrically connected with the electronic component.

In an exemplary embodiment of the present invention, the temperature sensor 31 includes a detection component 310 and a pair of lead wires 311. The detection component 310 is inserted into the mounting hole 321 and is in thermal contact with the inner surface of the mounting hole. The pair of lead wires 311 is electrically connected with the detection component 310 and extends to the outside of the mounting hole 321. The detection component 310 is inserted in the mounting hole 321 of the elastic thermal conductivity component 32 by way of an interference fit, enabling reliable thermal contact with the inner surface of the mounting hole.

The elastic thermal conductivity component 32 includes a thermal conductivity body 320. The mounting hole 321 is formed in the thermal conductivity body 320 and extends along its longitudinal direction. A slit 322 in communication with the mounting hole 321 is formed on one side of the thermal conductivity body 320 of the elastic thermal conductivity component 32. The slit 322 extends continuously from one end of the mounting hole 321 to the other end of the mounting hole. In this way, an insertion force of the temperature sensor 31 into the mounting hole 321 can be reduced, and the installation of the temperature sensor is made easier. The mounting hole 321 is a blind hole with a bottom and a top opening. The temperature sensor 31 is inserted into the mounting hole 321 through the top opening of the mounting hole 321.

The thermal conductivity body 320 has a thermal contact surface suitable for physical contact with the connection terminal 20, and the aforementioned slit 322 is formed on the side of the thermal conductivity body 320 opposite to the thermal contact surface. In this way, the thermal contact area between the thermal conductivity body 320 and the connection terminal 20 is not be reduced.

The connector may include a plurality of connection terminals 10 and a plurality of temperature detection assemblies 30. The plurality of temperature detection assemblies 30 are used to detect the temperature of the plurality of connection terminals 10 respectively. For example, in the illustrated embodiment, the connector is a DC connector with two connection terminals 20 and two temperature detection assemblies 30. However, the present invention is not limited to the illustrated embodiment. The connector can also be an AC connector including four connection terminals 20 and four temperature detection assemblies 30. In an exemplary embodiment of the present invention, the number of temperature detection assemblies 30 can also be less than the number of connection terminals 20, that is, the temperature of a part of connection terminals 20 can be detected.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A temperature detection assembly, comprising:

an elastic thermal conductivity component formed with a mounting hole and adapted to be inserted into an installation slot formed on a housing of a connector;

a temperature sensor inserted in the mounting hole of the elastic thermal conductivity component and adapted to detect the temperature of a connection terminal of the connector, the temperature sensor includes a detection component inserted into the mounting hole and in thermal contact with an inner surface of the mounting hole, and a pair of lead wires electrically connected to the detection component and extending outside of the mounting hole; and a retainer adapted to be installed on the housing of the connector and to fix the elastic thermal conductivity component in the installation slot.

2. The temperature detection assembly according to claim 1, wherein the detection component is inserted in the mounting hole of the elastic thermal conductivity component with an interference fit.

3. The temperature detection assembly according to claim 1, wherein the elastic thermal conductivity component comprises a thermal conductivity body, the mounting hole is formed in the thermal conductivity body along a longitudinal direction.

4. The temperature detection assembly according to claim 3, wherein a slit in communication with the mounting hole is formed on one side of the thermal conductivity body, and extends continuously between ends of the mounting hole.

5. The temperature detection assembly according to claim 4, wherein the thermal conductivity body defines a thermal contact surface adapted to physically contact the connection terminal, and the slit is formed on the side of the thermal conductivity body opposite to the thermal contact surface.

6. The temperature detection assembly according to claim 1, wherein the mounting hole is a blind hole with a bottom, and the temperature sensor is inserted into the mounting hole through a top opening of the mounting hole.

7. A connector, comprising:

a housing defining a terminal slot and an installation slot in communication with the terminal slot; and a temperature detection assembly, including:

an elastic thermal conductivity component formed with a mounting hole and arranged within the installation slot;

a temperature sensor inserted in the mounting hole of the elastic thermal conductivity component and adapted to detect the temperature of a connection terminal of the connector arranged within the terminal slot; and a retainer installed on the housing of the connector and fixing the elastic thermal conductivity component in the installation slot.

8. The connector according to claim 7, wherein a mating locking feature is formed on the housing for engaging with a locking feature of the temperature detection assembly to lock the temperature detection assembly to the housing.

9. The connector according to claim 7, further comprising a connection terminal inserted into the terminal slot, at least a part of the connection terminal is arranged in contact with the elastic thermal conductivity component arranged in the installation slot.

10. The connector according to claim 9, wherein the temperature sensor is thermally connected with the connection terminal via the elastic thermal conductivity component.

11. A retainer for fixing a temperature sensor in a housing of a connector, comprising:

a main body adapted to engage with an elastic thermal conductivity component, the main body is formed with a pair of lead through-holes sized to permit a pair of lead wires of the temperature sensor to pass therethrough; and a fixing part including a locking feature adapted to lock the retainer to the housing and secure the elastic thermal conductivity component in an installation slot of the housing.

12. The retainer according to claim 11, wherein:

the fixing part includes a pair of side plates connected opposite sides of the main body and adapted to be inserted into two fixing slots formed on the housing of the connector;

the locking feature is formed on each side plate and is adapted to be engaged with a mating locking feature formed on the inner wall of the fixing slot; and a bottom surface of the main body is adapted to rest against a top surface of the elastic thermal conductivity component to fix the elastic thermal conductivity component in the installation slot.

13. The retainer according to claim 12, wherein the locking feature is a locking slot formed on each of the side plates, and the mating locking feature is a protrusion formed on the inner wall of the fixing slot.

14. The retainer according to claim 11, wherein the main body is adapted to be inserted into the installation slot, and the locking feature is formed on two sides of the main body and is adapted to engage with a mating locking feature formed on the inner wall of the installation slot.

15. The retainer according to claim 14, wherein the locking feature is a protrusion part formed on the main body, and the mating locking feature is a step part formed on the inner wall of the installation slot.

16. The retainer according to claim 11, further comprising a binding part connected to the main body for binding a pair of lead wires of the temperature sensor to the main body, when the pair of lead wires is not bound by the binding part, the pair of lead wires is led out from the retainer in a first direction, and when the pair of lead wires is bound by the binding part, the pair of lead wires is led out from the retainer in a second direction at a predetermined angle with the first direction.

17. The retainer according to claim 16, wherein the binding part defines a curved hook elastic cantilever, a fixed end of the binding part is connected to the top of the main body, and the pair of lead wires is capable of entering the binding part through a gap between a free end of the binding part and the top of the main body.

18. The retainer according to claim 11, wherein a side opening in communication with at least one of the lead through-holes is formed on the side of the main body.

19. A temperature detection assembly, comprising:

an elastic thermal conductivity component formed with a mounting hole and adapted to be inserted into an installation slot formed on a housing of a connector;

a temperature sensor inserted in the mounting hole of the elastic thermal conductivity component and adapted to detect the temperature of a connection terminal of the connector, the elastic thermal conductivity component comprises a thermal conductivity body, the mounting hole is formed in the thermal conductivity body along a longitudinal direction, a slit in communication with the mounting hole is formed on one side of the thermal conductivity body and extends continuously between ends of the mounting hole; and a retainer adapted to be installed on the housing of the connector and to fix the elastic thermal conductivity component in the installation slot.

20. The temperature detection assembly according to claim 19, wherein the thermal conductivity body defines a thermal contact surface adapted to physically contact the connection terminal, and the slit is formed on the side of the thermal conductivity body opposite to the thermal contact surface.

21. A retainer for fixing a temperature sensor in a housing of a connector, comprising:

a main body adapted to engage with an elastic thermal conductivity component;

a fixing part including a locking feature adapted to lock the retainer to the housing and secure the elastic thermal conductivity component in an installation slot of the housing; and a binding part connected to the main body for binding a pair of lead wires of the temperature sensor to the main body, when the pair of lead wires is not bound by the binding part, the pair of lead wires is led out from the retainer in a first direction, and when the pair of lead wires is bound by the binding part, the pair of lead wires is led out from the retainer in a second direction at a predetermined angle with the first direction.

22. The retainer according to claim 21, wherein the binding part defines a curved hook elastic cantilever, a fixed end of the binding part is connected to the top of the main body, and the pair of lead wires is capable of entering the binding part through a gap between a free end of the binding part and the top of the main body.

* * * * *